United States Patent [19]

Dunn

[11] 4,283,889
[45] Aug. 18, 1981

[54] GREENHOUSE CONSTRUCTION

[76] Inventor: Michael D. Dunn, Emerald Acres, Rte. 2, Mineral, Va. 23117

[21] Appl. No.: 105,148

[22] Filed: Dec. 19, 1979

[51] Int. Cl.³ .......................... E04B 1/343; E04B 7/16
[52] U.S. Cl. ............................................ 52/66; 47/17; 52/64; 52/173 R
[58] Field of Search ................... 47/17; 52/66, 64, 71, 52/173 R

[56] References Cited

U.S. PATENT DOCUMENTS

| | | | |
|---|---|---|---|
| 811,951 | 2/1906 | Pierson | 52/64 |
| 2,019,831 | 11/1935 | Ricardo | 52/66 X |
| 2,094,801 | 10/1937 | Mass | 52/64 |
| 2,229,908 | 1/1941 | Wenneborg | 52/66 |
| 3,299,589 | 1/1967 | Hay | 52/71 |
| 3,566,555 | 3/1973 | Schultz et al. | 52/64 |
| 4,110,941 | 9/1978 | Scott | 52/66 |

FOREIGN PATENT DOCUMENTS

| | | | |
|---|---|---|---|
| 738450 | 8/1943 | Fed. Rep. of Germany | 47/17 |
| 685367 | 3/1965 | Italy | 52/66 |

*Primary Examiner*—Alfred C. Perham
*Attorney, Agent, or Firm*—Hall & Houghton

[57] ABSTRACT

A greenhouse structure with flooring means and side and end wall means defining a plant growing area has a roof structure means comprising a ridge above said growing area and rafter means extending from said ridge downwardly and outwardly past said side wall means to terminal end portions at which anchor means are provided securing said rafter ends to said flooring means. It also has a slidable roof means mounted on said rafter means for movement to different positions thereon including a first position in which it extends from said ridge to said side wall means and preferably past the same for forming an overhang or eave therebeyond, and a second position in which it lies between said side wall means and said anchor means. The slidable roof means in the preferred embodiment is water shedding and heat insulating, and may be formed of opaque fiber glass, but preferably is formed of aluminum sheet embossed for strength and having a heat insulating layer on its under side. Operating means is coupled to the slidable roof means for sliding the same between said first and second positions; anti-friction means is preferably interposed between said sliding roof means and said supporting rafter means; and retaining means is provided to secure the sliding roof means against displacement from said rafter means. A light transmitting ceiling means is provided, extended above said growing area and in spaced relation to said insulating layer in the first position of said sliding roof means for providing a dead air space therebetween.

9 Claims, 3 Drawing Figures

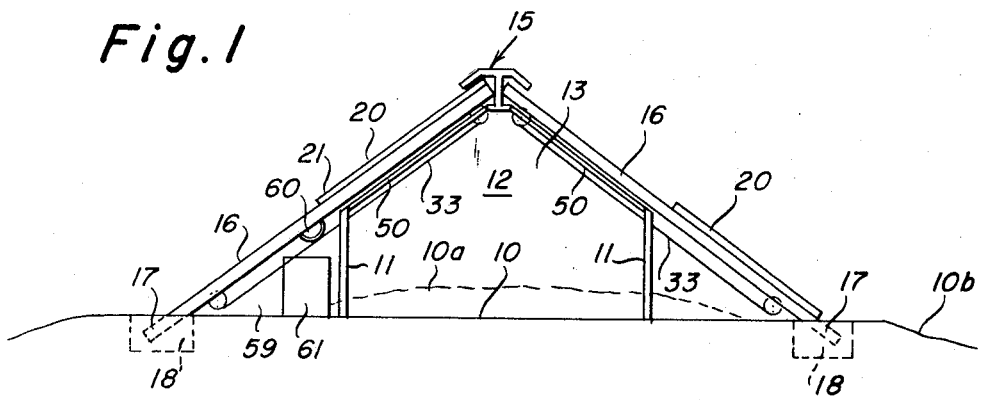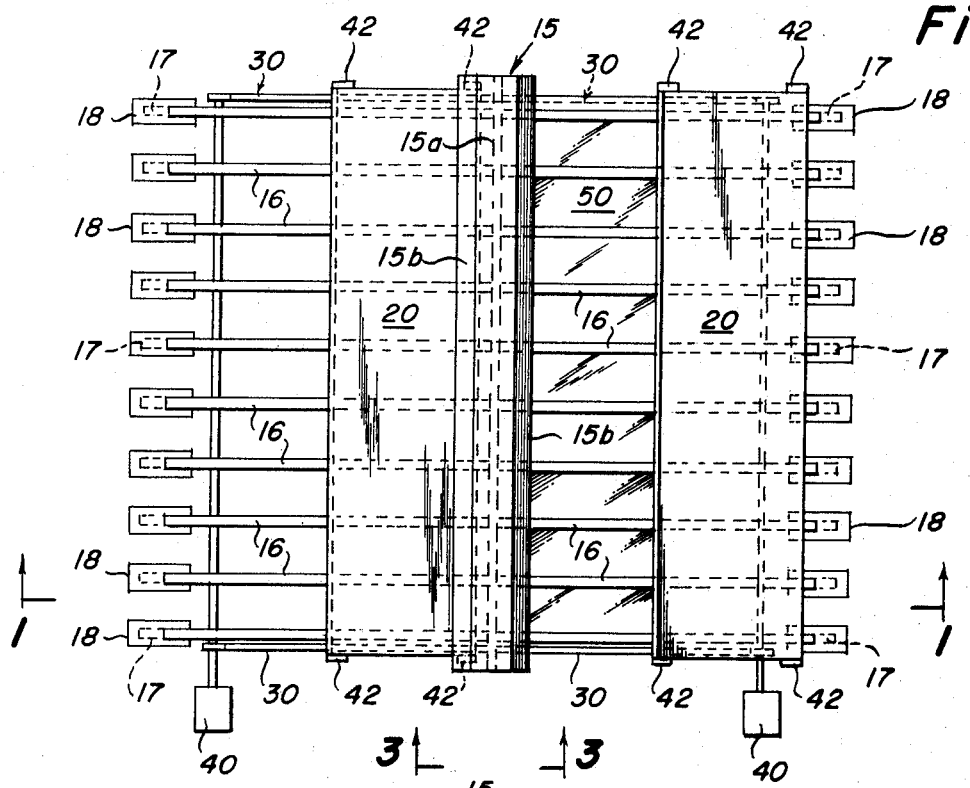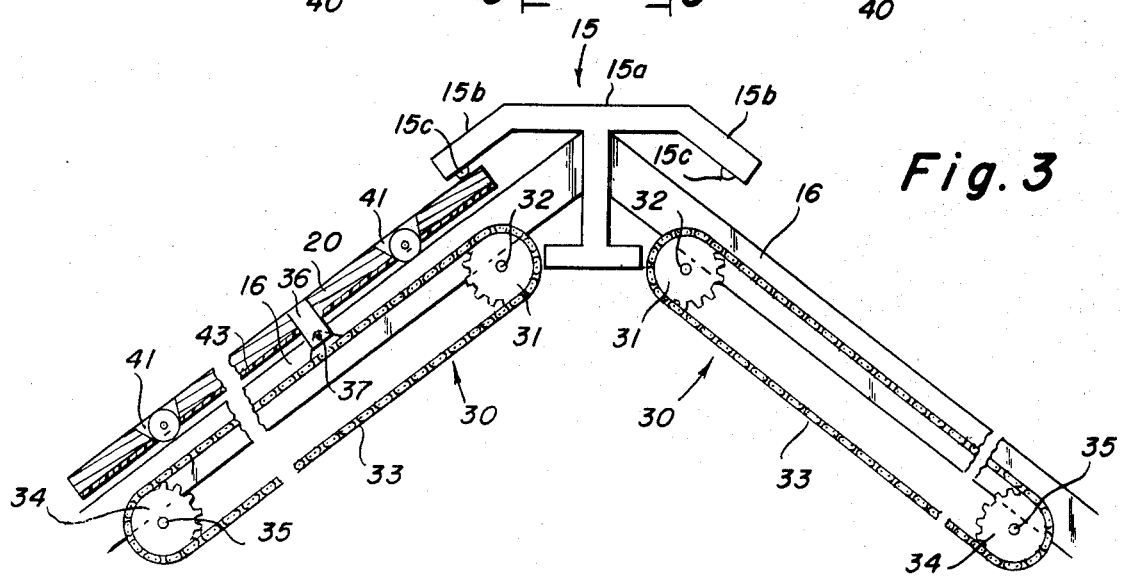

GREENHOUSE CONSTRUCTION

BACKGROUND OF THE INVENTION

1. Field of the Invention

This invention relates to greenhouses and the like and aims generally to improve the same.

2. State of the Art

Greenhouses, as generally constructed, comprise floor or foundation means supporting front and side wall means and roof framing upon which are mounted glass panes or panels, some of which are tiltable to provide ventilation, such panels allowing entrance of sunlight for heating the interior and stimulating plant growth therein. Sometimes whitewash or flexible screens are employed to shade the growing plants if desired. Sometimes in lieu of glass panels transparent or translucent plastic sheets or panels are employed as light admitting means. All these light admitting structures are relatively fragile and present a major problem of storm damage from wind, hail, flying debris and accumulation of snow loads. Also it is difficult and expensive to maintain such structures at growing temperatures in winter weather.

SUMMARY OF THE INVENTION

Among the objects of the present invention, severally and independently, are: to provide a greenhouse structure better adapted to resist storm damage than such prior structures; to provide a greenhouse structure more easily and economically heated when necessary; to provide a greenhouse structure making very effective use of relatively light structural members; and generally to improve the economy and utility of such structures.

The invention will be more readily understood from the following description of preferred embodiments thereof which are to be deemed illustrative and not restrictive of the invention, the scope of which is pointed out in the appended claims.

SHORT DESCRIPTION OF THE DRAWINGS

In the accompanying somewhat diagrammatic drawings of a preferred embodiment of the invention:

FIG. 1 is a cross-sectional view taken on the line 1—1 of FIG. 2 in the direction of the arrows, of a greenhouse embodying the invention, FIG. 2 is a plan view of such greenhouse, and FIG. 3 is a ridge detail taken on the line 3—3 of FIG. 2 in the direction of the arrows.

In the embodiments shown in FIGS. 1-3, the greenhouse comprises flooring means 10, side wall means 11 and end wall means 12, defining a plant growing area 13. The flooring means 10 may be terreous, e.g. of earth, as shown, or may be a structure superposed on the earth, such being conventional in greenhouses. The side walls 11 may be of any suitable or conventional form, as wood, masonry, metal, or clear or opaque glass or fiber glass and may be of non-load-bearing curtain-wall construction, as hereinafter explained. The front and rear end wall means 12 may be of any suitable form and may be provided with doors, windows, ventilating equipment and shading curtains, if desired.

One or more of the side or end walls may be the wall of an adjacent structure, in the case of a non-free-standing greenhouse.

As shown, the greenhouse has roof structure means comprising ridge or ridgepole means 15 above the growing area 13 and rafter means 16 sloping from the ridge means 15 downwardly and outwardly to terminal end portions 17 which are secured to the flooring means 10 as by any suitable anchor means 18. The anchor means 18 may be of any suitable form, and in the form shown, in which the earth is used as flooring, at least the principal rafters have their terminal ends 17 set in poured concrete anchors at 18, other rafters having their terminal ends 17 secured either by the same or different types of anchor means, as desired. The rafter means 16 may consist of beams or struts formed of wood or metal, as desired. As shown, rafters of I-beam cross section are employed for strength and the webs thereof may have cut-away portions or be of expanded metal for lightness. Because the rafters 16 extend beyond the side walls 11 and are anchored to the flooring means 10 they add greatly to the strength of the structure.

Slidable roof means 20 are mounted on said rafter means 16 for sliding movement up and down the slope thereof to a first position (illustrated at the left in the figures) in which the sliding roof means extends over the growing area 13 between the ridge means 15 and said side wall means 11, e.g. by extending from ridge means 15 to the side wall means 11 and preferably beyond the same to form an overhang or eave 21 therebeyond, and to a second position (illustrated at the right in the figures) in which the sliding roof means 20 lies between the side wall means 11 and the anchor means 18.

Roof positioning means 30 is coupled to the slidably mounted roof means 20 for moving the latter between said first position adjacent the ridge 15 and said second position adjacent the anchor means 18, and to positions intermediate therebetween. This positioning means 30 may be of any suitable form and is illustrated as of the chain and sprocket type in FIG. 3, comprising sprocket means 31 adjacent the ridge 15 mounted on shafts 32 and engaged with drive chain means 33 which pass around sprocket means 34 mounted on shaft means 35 adjacent the anchor means 18, the chain means 33 being anchored to the under sides of the sliding roof means 20, preferably by brackets 36 and pintles 37.

The shaft 32, or 35, preferably the latter, may be rotated by any suitable powering means 40, which may comprise worm and wheel gearing driven by suitable operating means such as hand crank or electric motor means preferably provided with manual switch means and with limit switch means which may be tripped by appropriately positioned lugs on the chains 33 or otherwise.

For convenience of operation and servicing, the shaft 35 and powering means 40 with its manual switch means, is preferably located conveniently at a level no higher than said side wall means 11, and preferably below said rafter means 16 proximate to the terminal end portions 17. As best shown at the left-hand side of FIG. 3, the roof-positioning means 30 in the illustrative embodiment comprises anti-friction means 41 interposed between the rafter means 16 and the slidably mounted roof means 20 to facilitate sliding of the latter.

As shown in the figures, it is preferred to provide roof positioning means 30 having separate operating means 40 for each slidably mounted roof 20 so that said slidable roof elements may be separately positioned as desired. It will be understood, however, that if desired, several operating means 30 or the powering means 40 may be interconnected to operate simultaneously.

For ease of operation, in its preferred form the invention comprises a light weight water shedding construction of the sliding roof elements 20 which may be formed of opaque fiber glass, or of sheet aluminum, for example. In the preferred form, in which the roof means 20 is water shedding and forms the overhanging eave 21 in its first position, the greenhouse also comprises, in the utility or storage space 59 below said roof means 16, means for receiving and storing water shed from said eave 21 in the first position of the roof means 20, shown herein as gutter means 60 (FIG. 1) outside the side wall means 11 and discharging to a storage tank 61 in said utility space 59 from which the stored water may be pumped or otherwise removed for application to plants within or outside the growing area by any suitable means (not shown).

The sliding roof means 20 in the form shown, comprises a layer of heat insulating material 43 secured to its under side, preferably adhesively, which may be provided by spraying said underside with a thick coating of styrofoam insulation or the like. In cold climates this provision and the dead air space provided as hereinafter described, inhibits loss of heat when the roofing means 20 is in its raised or first position, reducing fuel costs for heating; and in extremely hot climates the insulating layer 43 supplements the shading effect obtainable by variously positioning each slidably mounted roofing means.

Suitable retaining means 42 (FIG. 2) are provided for securing the sliding roof means 20 against disengagement from the rafter means 16. Such retaining means may be of any suitable form, e.g. similar to but smaller than those forms heretofore used for preventing roller coaster cars from becoming disengaged from the tracks supporting them but permitting free travelling movement of the cars.

In the preferred embodiments as best illustrated in FIG. 3, the ridge piece 15 is of I-beam or T-beam form and is provided with a ridge cap 15a which has outwardly and downwardly extending water shedding portions 15b to extend above the rafter means 16 in such position that the upper edges of the sliding roof members 20 underlie said portions 15b when such members are in their raised or first positions. If desired, suitable sealing elements, e.g. rubber tubing 15c, may be applied to the undersides of the portions 15b or the upper ends of the sliding roof means 20 to provide a weather seal at their junction.

As best shown in FIGS. 1 and 2, light transmissive flexible or rigid ceiling means 50 is positioned above the growing area between the side and end wall means 11 and 12, in spaced relation to the slidably mounted roof means 20 in the upper or first position thereof, for providing a heat insulating dead air space therebetween above said growing area, said ceiling means 50 admitting light to said growing area in positions of said slidably mounted roof means other than said first position.

In the form shown the greenhouse is of gabled end form, and the ridge 15 is centered above the growing area, there being two sets of rafter means 16 extending therefrom. For a lean-to type of greenhouse, the ridge 15 may be attached to the wall of the adjacent structure above the proximate edge portion of the growing area and the rafter means 16 may extend only from one side of the ridge means 15.

As best shown in FIG. 1, the flooring means 10 may be of bare earth and, as illustrated by broken lines 10a, may be sloped or graded outwardly and downwardly from a more elevated portion underlying the ridge 15 and/or from the side wall means 11 to a drain area 10b preferably beyond the anchor means 18, and the flooring means 10 may be surfaced with any suitable means such as tile or wooden slat means or gravel, as desired (not shown).

Thus, while there have been described herein what are at present considered preferred embodiments of the invention, it will be obvious to those skilled in the art that modifications, including changes, omissions and substitutions, may be made without departing from the essence and principle of the invention. It is therefore to be understood that the exemplary embodiments herein are illustrative and not restrictive of the invention, the scope of which is pointed out in the appended claims, and that all modifications that come within the meaning and range of equivalency of the claims are intended to be included therein.

I claim:

1. A greenhouse comprising:
   (a) flooring means and side and end wall means defining a plant growing area,
   (b) roof structure means comprising ridge means above said growing area, rafter means sloping from said ridge means downwardly and outwardly past said side wall means to terminal end portions, and anchor means securing said terminal end portions to said flooring means,
   (c) roof means slidably mounted on said sloping rafter means and slidable up and down the slope thereof between first and second positions, said roof means in said first position extending over said plant growing area between said ridge means and said side wall means and in said second position lying between said side wall means and said anchor means,
   (d) roof positioning means coupled to said slidably mounted roof means for sliding and positioning the same between said first and second positions,
   (e) retaining means for securing said slidably mounted roof means against disengagement from said rafter means, and
   (f) light transmissive ceiling means positioned above said growing area and in spaced relation to said slidably mounted roof means in the first position thereof for providing a heat insulating dead air space therebetween above said growing area and for admitting light to said growing area in other positions of said slidably mounted roof means.

2. A greenhouse according to claim 1, wherein said flooring means is terreous and said anchor means comprises concrete elements set thereinto and embedding at least some of said terminal end portions.

3. A greenhouse according to claim 2 wherein said terreous flooring means is graded outwardly and downwardly from said side wall means to and beyond said anchor means.

4. A greenhouse according to claim 1 wherein said ridge means comprises a roof cap structure having a water shedding portion projecting downwardly above said rafter means in such position that the upper edge of said movable roof means underlies said portion in said first position.

5. A greenhouse according to claim 1 wherein said slidably mounted roof means is water shedding and in said first position extends from said ridge means to and beyond said side wall means to form an overhanging eave, said greenhouse also comprising, in the space below said rafter means, means for receiving and storing water shed from said eave in said first position of said roof means.

6. A greenhouse according to claim 1 wherein said slidably mounted roof means is water shedding and heat insulating.

7. A greenhouse according to claim 6 wherein said slidably mounted roof means is comprised of a sheet aluminum body having heat insulating material secured to its under side.

8. A greenhouse according to claim 1 wherein said roof positioning means comprises anti-friction means interposed between said rafter means and said slidably mounted roof means to facilitate sliding of the latter.

9. A greenhouse according to claim 1 wherein said roof positioning means comprises operating means located adjacent to said terminal end portions of said rafter means.

* * * * *